US009561872B2

(12) United States Patent
Steel

(10) Patent No.: US 9,561,872 B2
(45) Date of Patent: Feb. 7, 2017

(54) METHOD OF DETECTING A LEAK PAST A DYNAMIC SEAL IN AIRCRAFT LANDING GEAR

(71) Applicant: MESSIER-BUGATTI-DOWTY, Velizy Villacoublay (FR)

(72) Inventor: Graeme Steel, Courtice (CA)

(73) Assignee: MESSIER-BUGATTI-DOWTY, Velizy Villacoublay (FR)

( * ) Notice: Subject to any disclaimer, the term of this patent is extended or adjusted under 35 U.S.C. 154(b) by 29 days.

(21) Appl. No.: 14/789,314

(22) Filed: Jul. 1, 2015

(65) Prior Publication Data
US 2016/0009423 A1   Jan. 14, 2016

(30) Foreign Application Priority Data

Jul. 9, 2014  (FR) ...................... 14 56639

(51) Int. Cl.
B64F 5/00 (2006.01)
F16F 9/36 (2006.01)
G01M 3/04 (2006.01)
B64C 25/00 (2006.01)
B64C 25/02 (2006.01)
B64C 25/60 (2006.01)

(52) U.S. Cl.
CPC ........... B64F 5/0045 (2013.01); B64C 25/001 (2013.01); B64C 25/02 (2013.01); B64C 25/60 (2013.01); F16F 9/362 (2013.01); G01M 3/04 (2013.01)

(58) Field of Classification Search
CPC ......... B64F 5/0045; F16F 9/362; B64C 25/60; B64C 25/62; G01M 3/04
See application file for complete search history.

(56) References Cited

U.S. PATENT DOCUMENTS

| 5,584,368 A * | 12/1996 | Larsson | F16F 9/362 |
| | | | 188/322.16 |
| 2008/0163668 A1 | 7/2008 | Kurtz et al. | |
| 2016/0178064 A1* | 6/2016 | Vatovec | F16J 15/3296 |
| | | | 244/100 R |

FOREIGN PATENT DOCUMENTS

| EP | 0762100 A1 | 3/1997 |
| WO | 2010/142802 A1 | 12/2010 |

OTHER PUBLICATIONS

French Preliminary Search Report of FR 1456639 dated Mar. 31, 2015.

* cited by examiner

Primary Examiner — Brian M O'Hara
(74) Attorney, Agent, or Firm — Sughrue Mion, PLLC

(57) ABSTRACT

A leak detection method for detecting a leak past a dynamic seal in aircraft landing gear (100) comprising: a strut (10); a rod (20) slidably mounted in the strut; and a bearing (70) fitted to an end (11) of the strut to guide the rod (20). The bearing includes a bushing (50) having a seal (62) arranged to rub against the rod (20) to provide sealing between the strut and the rod, defines a fluid chamber (2), and a stop nut (40) for preventing the bushing from moving relative to the strut. The method includes a step of installing a test nut (3) without a wiper seal in the place of the stop nut (40), the step of putting the hydraulic fluid in the landing gear under pressure, and the step of verifying the existence of a leak of hydraulic fluid on the outside surface (22) of the rod (20).

6 Claims, 2 Drawing Sheets

METHOD OF DETECTING A LEAK PAST A DYNAMIC SEAL IN AIRCRAFT LANDING GEAR

The invention relates to aircraft landing gear, and more particularly to testing for leaks of hydraulic fluid in such aircraft landing gear.

BACKGROUND OF THE INVENTION

Tests for leaks of hydraulic fluid in aircraft landing gear are known that seek to determine whether the dynamic seal(s) present between the strut and the sliding rod of the landing gear leg do indeed provide sealing without allowing any hydraulic fluid to pass to the outside of the landing gear strut, particularly along the sliding rod, when the landing gear is under pressure. In general, the strut has a bearing including at least one dynamic seal for rubbing against the sliding rod, the bearing being prevented from moving axially by a stop nut provided with a wiper seal.

These tests are generally performed as follows:
pressurizing said landing gear with the hydraulic fluid;
ceasing to pressurize the landing gear;
partially dismantling the stop nut of the bearing, where this is essential given that the wiper seal can prevent leakage running down from a leak in the dynamic sealing means; and
inspecting the rod to verify whether any leakage is present thereon, and thus verify whether a leak is present.

Nevertheless, it has been found that partially dismantling the stop nut for preventing movement in translation together with its wiper seal can damage the wiper seal, thus requiring the landing gear leg to be dismantled completely in order to be able to remove the stop nut and thus replace its wiper seal. Such a procedure takes time and delays putting the landing gear into service.

OBJECT OF THE INVENTION

An object of the invention is to provide a test method that performs the same functions as those in the prior art while reducing the risk of damaging the wiper seal.

SUMMARY OF THE INVENTION

In order to achieve this object, the invention provides a method of detecting a leak past a dynamic seal in aircraft landing gear comprising at least:
a strut;
a rod slidably mounted in the strut; and
a bearing fitted to an end of the strut to guide the rod, the bearing including at least one bushing having at least one dynamic seal arranged to rub against the rod in order to provide sealing between the strut and the rod, thereby defining a chamber filled with hydraulic fluid between the strut and the rod, and a stop nut for preventing the bushing from moving in translation relative to the strut and provided with at least one wiper seal arranged to wipe hydraulic fluid on the rod.

According to the invention, the method includes a step of installing a test nut without a wiper seal in the place of the stop nut, the step of putting the hydraulic fluid in the landing gear under pressure, and the step of verifying the existence of a leak, if any, of hydraulic fluid on the outside surface of the rod.

The use of a test nut without a wiper seal to take the place of the final stop nut for preventing movement in translation together with its wiper seal enables the leak detection test to be performed while preserving said final stop nut from potential dismantling.

BRIEF DESCRIPTION OF THE FIGURES

The invention can be better understood on reading the following description of a particular non-limiting embodiment given with reference to the figures of the accompanying drawings, in which.

DETAILED DESCRIPTION OF THE INVENTION

Figure 1:
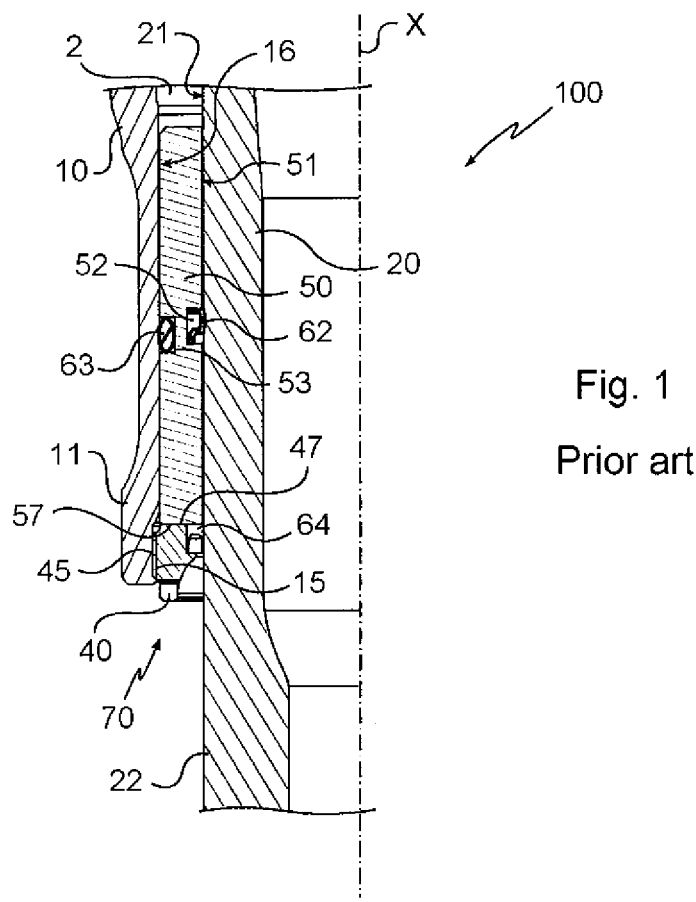
FIG. 1 is a section view of a landing gear assembly with a stop nut for stopping movement in translation and provided with its wiper seal mounted at the end of the landing gear.

With reference to FIG. 1, the invention relates to a method of detecting a hydraulic fluid leak that makes it possible to detect a leak in aircraft landing gear 100 comprising a strut 10 and a rod 20 slidably mounted in the strut 10 and movable in translation along an axis X, with an outside surface 22 of the rod remaining visible outside the strut 10. A bearing 70 is fitted to one end 11 of the strut 10 in order to guide the rod 20, the bearing 70 in this example comprising:
a bushing 50 arranged so that a cylindrical surface 51 of said bushing 50 co-operates with a cylindrical surface 21 of the rod 20 in order to provide a "sliding" assembly between the rod 20 and the strut 10, the rod 20 thus being capable of sliding along the axis X;
at least one dynamic seal 62 mounted in a housing 52 of the bushing 50 and arranged to rub against the cylindrical surface 21 of the rod 20 in order to provide sealing between the bushing 50 and the rod 20, defining a chamber 2 between the strut 10 and the rod 20, which chamber 2 is filled with hydraulic fluid;
at least one seal 63 mounted in a housing 53 in the bushing 50 and arranged to rub against a surface 16 of the strut 10 in order to provide sealing between said strut and the bushing 50; and
a stop nut 40 for preventing movement in translation, the stop nut having a face 47 arranged to come into abutment against a face 57 of the bushing so as to prevent the bushing 50 from moving in translation relative to the end 11 of the strut 10, and provided with a threaded zone 45 that is arranged to co-operate with a threaded zone 15 of the end 11, and being provided with a wiper seal 64 arranged to wipe the hydraulic fluid on the cylindrical surface 21 of the rod 20.

In such an assembly, and when the chamber 2 filled with hydraulic fluid is under pressure, any leaks of hydraulic fluid are due to failure of the dynamic seal 62. In the event of a leak, said dynamic seal allows hydraulic fluid to flow from the chamber 2, between the cylindrical surfaces 21 of the rod 20 and 51 of the bushing 50, to the outside of the strut, and more precisely along the outside surface 22 of the rod 20.

In the context of a conventional test for detecting a leak of hydraulic fluid, the required assembly is the same as the final assembly, i.e. it involves all of the above-mentioned parts, including the stop nut 40 for preventing movement in translation and its wiper seal 64. Since the wiper seal 64 can prevent fluid coming from a leak from flowing to the outside of the strut, along the outside surface 22, it is essential to dismantle the stop nut 40 in part after the test in order to verify that no leakage has been stopped by the wiper seal 64.

However such dismantling may lead to the wiper seal 64 being damaged. Instead, and in accordance with the method of the invention, a test nut 3 is used that does not have a wiper seal and that therefore allows a leak of hydraulic fluid, if any, to pass.

Figure 2:
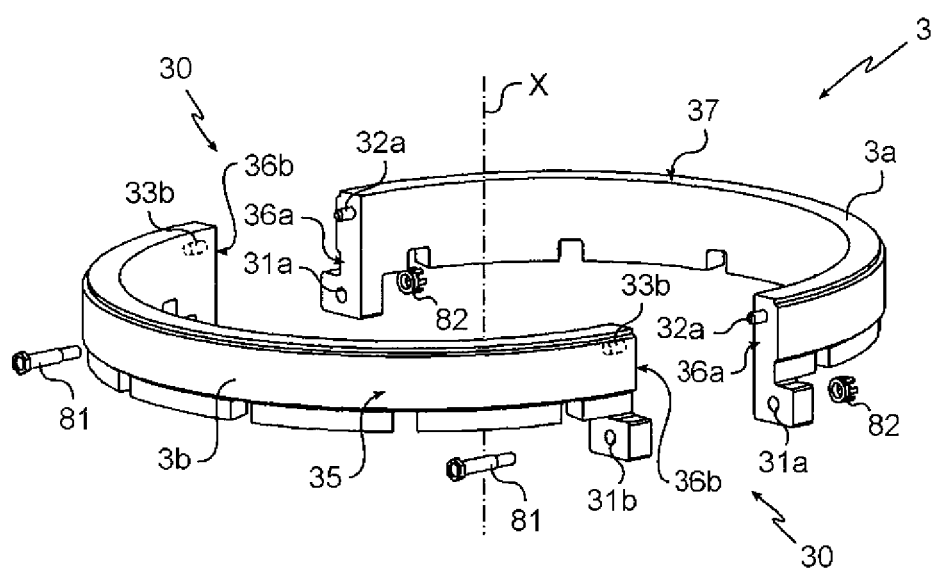
FIG. 2 is an overall view of the test nut.

With reference to FIG. 2, in order to detect a leak, a test nut 3 is used that does not have a wiper seal and that is subdivided into two half-cylinders 3a and 3b that are arranged so as to be suitable for assembling together by sets of fasteners 30. In non-limiting manner, said sets of fasteners 30 include respective faces 36a and 36b of the two half-cylinders 3a and 3b that are arranged to come into abutment one against the other. Pegs 32a belonging to the half-cylinder 3a co-operate with bores 33b in the half-cylinder 3b in order to center the half-cylinders 3a and 3b relative to each other. The test nut 3 is held in position by two nut-and-bolt assemblies each comprising at least one bolt 31 co-operating with a bore 31a or 31b in a respective one of the half-cylinders 3a and 3b, and with a nut 82. Assembling the two half-cylinders 3a and 3b together creates a single threaded zone 35 arranged so as to enable the test nut 3 to be mounted at the end of the strut of the landing gear. Assembling the two half-cylinders 3a and 3b together thus creates a single face 37 arranged so as to be capable of coming into abutment with the bushing and thus prevent said bushing from moving in translation.

The use of such a nut in two portions, whether for testing before putting aircraft landing gear into service or for testing during maintenance, serves to avoid dismantling the entire landing gear in order to perform said test, thereby achieving a precious saving of time.

Figure 3A:
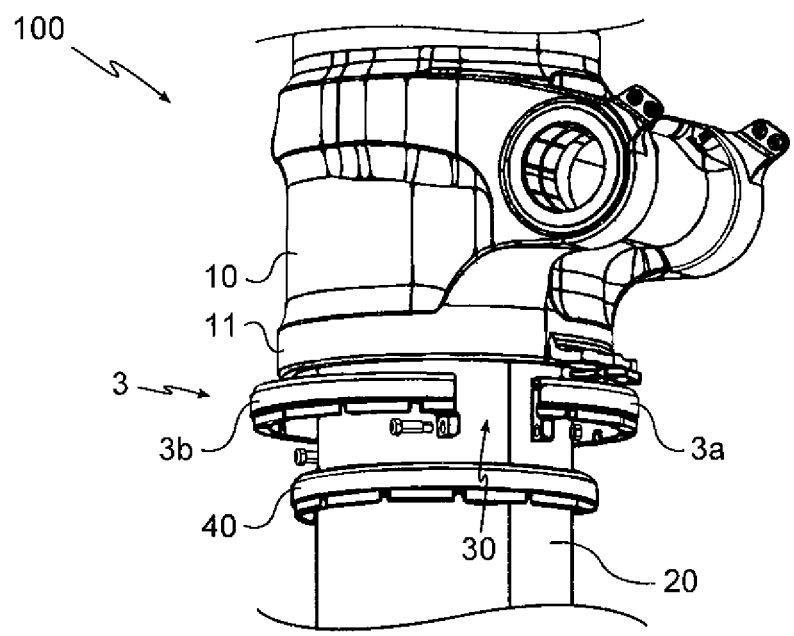
FIG. 3a is an overall view of a landing gear assembly with the test nut being put into place.

With reference to FIG. 3a, the leak detection method of the invention includes the step of positioning the test nut 3 by assembling its two half-cylinders 3a and 3b together around the rod 20, the half-cylinders being fastened to each other by the sets of fasteners 30. It should be observed that the stop nut 40 for preventing movement in translation has already been mounted on the rod 20, but is lowered so as to allow the test nut 3 to be put into place.

Figure 3B:
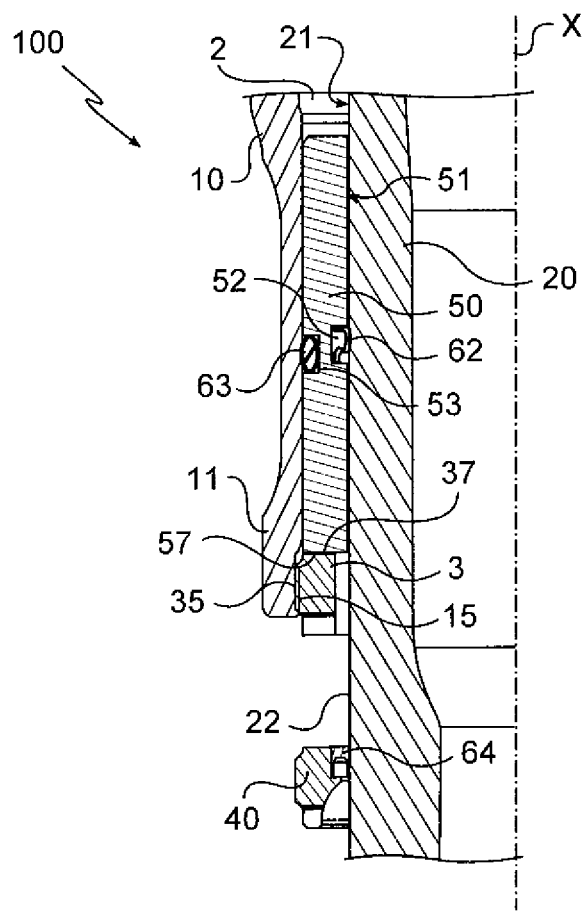
FIG. 3b is a section view of a landing gear assembly with the test nut taking the place at the end of the strut, both of the stop nut for stopping movement in translation and of its wiper seal.

With reference to FIG. 3b, the leak detection method of the invention includes the step of assembling together the two half-cylinders 3a and 3b (not visible in FIG. 3b) so as to form the test nut 3 that is mounted at the end 11 of the strut 10, taking the place both of the stop nut 40 for preventing movement in translation and also of its wiper seal 64. The test nut 3 is held in position relative to the end 11 by its threaded zone 35 that co-operates with the threaded zone 15 of the end 11 of the strut. A face 37 of the test nut 3 comes into abutment against the face 57 of the bushing 50 where it performs the function of stopping the bushing from moving in translation. It should be observed that the stop nut 40 for preventing movement in translation together with its wiper seal 64 continues to be positioned on the rod 20 during this step.

Still with reference to FIG. 3b, and now that the test nut 3 without a wiper seal is mounted to take the place of the stop nut 40 for preventing movement in translation, the chamber 2 filled with hydraulic fluid is put under pressure for a determined length of time.

The outside surface 22 of the rod 20 is then inspected in order to verify whether any leakage has appeared.

If no leak has been detected after putting the chamber 2 under pressure while using the test nut 3, it then suffices to remove said test nut and to replace it with the stop nut 40 for preventing movement in translation, which stop nut is already mounted on the rod 20.

In contrast, if a leak of hydraulic fluid is detected after putting the fluid under pressure, then the landing gear needs to be dismantled in order to replace the dynamic seals 62 that are responsible for the leak.

The invention claimed is:

1. A leak detection method for detecting a leak past a dynamic seal in aircraft landing gear (100) comprising at least:
   a strut (10);
   a rod (20) slidably mounted in the strut; and
   a bearing (70) fitted to an end (11) of the strut to guide the rod (20), said bearing including at least one bushing (50) having at least one dynamic seal (62) arranged to rub against the rod (20) in order to provide sealing between the strut and the rod, thereby defining a chamber (2) filled with hydraulic fluid between the strut and the rod, and a stop nut (40) for preventing the bushing from moving in translation relative to the strut and provided with at least one wiper seal (64) arranged to wipe hydraulic fluid on the rod;
   the method being characterized in that it includes a step of installing a test nut (3) without a wiper seal in the place of the stop nut (40), a step of putting the hydraulic fluid in the landing gear under pressure, and a step of verifying the existence of a leak, if any, of hydraulic fluid on an outside surface (22) of the rod.

2. A method according to claim 1 for detecting a leak in aircraft landing gear (100), wherein, if a leak is detected, the dynamic seal (62) is replaced.

3. A method according to claim 1 for detecting a leak in aircraft landing gear (100), wherein, if no leak is detected, the test nut (3) is replaced by the stop nut (40) for preventing movement in translation.

4. A method according to claim 1 for detecting a leak in aircraft landing gear (100), wherein the stop nut (40) for preventing movement in translation is previously positioned on the rod (20) and needs only to be mounted to the end (11) of the strut in order to take the place of the test nut (3).

5. A method according to claim 1 for detecting a leak in aircraft landing gear (100), wherein the test nut (3) can be fitted and removed independently of the other parts of the aircraft landing gear.

6. A method according to claim 1 for detecting a leak in aircraft landing gear (100), wherein the test nut (3) is subdivided into two half-cylinders (3a, 3b) that are arranged to be assembled together.

* * * * *